United States Patent [19]

Moreau

[11] Patent Number: 5,752,711
[45] Date of Patent: May 19, 1998

[54] BICYCLE

[76] Inventor: Gregory John Moreau, 88 Old Penetang Road, Wyebridge, Ontario, Canada, L0K 2E0

[21] Appl. No.: 568,505

[22] Filed: Dec. 7, 1995

Related U.S. Application Data

[62] Division of Ser. No. 286,818, Aug. 5, 1994, Pat. No. 5,501,477.

[51] Int. Cl.⁶ .................................................. B62K 21/12
[52] U.S. Cl. .......................... 280/276; 280/283; 74/551.2; 74/551.4
[58] Field of Search ........................... 280/275, 276, 280/278, 279, 283, 233, 234, 242.1, 244; 74/551.1, 551.2, 551.3, 551.4, 551.5, 551.6

[56] References Cited

U.S. PATENT DOCUMENTS

| 561,329 | 6/1896 | Leonard | 74/551.6 |
|---|---|---|---|
| 5,121,652 | 6/1992 | Morrone | 74/551.3 |
| 5,186,074 | 2/1993 | Arnold | 280/276 X |
| 5,241,881 | 9/1993 | Chen | 280/276 X |
| 5,405,159 | 4/1995 | Klein et al. | 74/551.2 X |
| 5,501,477 | 3/1996 | Moreau | 280/281.1 |
| 5,511,444 | 4/1996 | Clausen et al. | 74/551.2 |

FOREIGN PATENT DOCUMENTS

| 2 695 371 | 3/1994 | France | 74/551.2 |

*Primary Examiner*—Kevin Hurley
*Attorney, Agent, or Firm*—Ostrolenk, Faber, Gerb & Soffen, LLP

[57] ABSTRACT

An improved bicycle includes a handlebar which may be moved such that the handlebar remains essentially unmoved when the bicycle frame moves when encountering an obstacle and/or irregularity. Various embodiments provide different degrees of movement of the handlebars and linear or arcoidal types of movement. In one embodiment, movement of the handlebar with respect to the bicycle frame results in a movement of the bicycle's seat to allow for an improved posture for the rider.

7 Claims, 10 Drawing Sheets

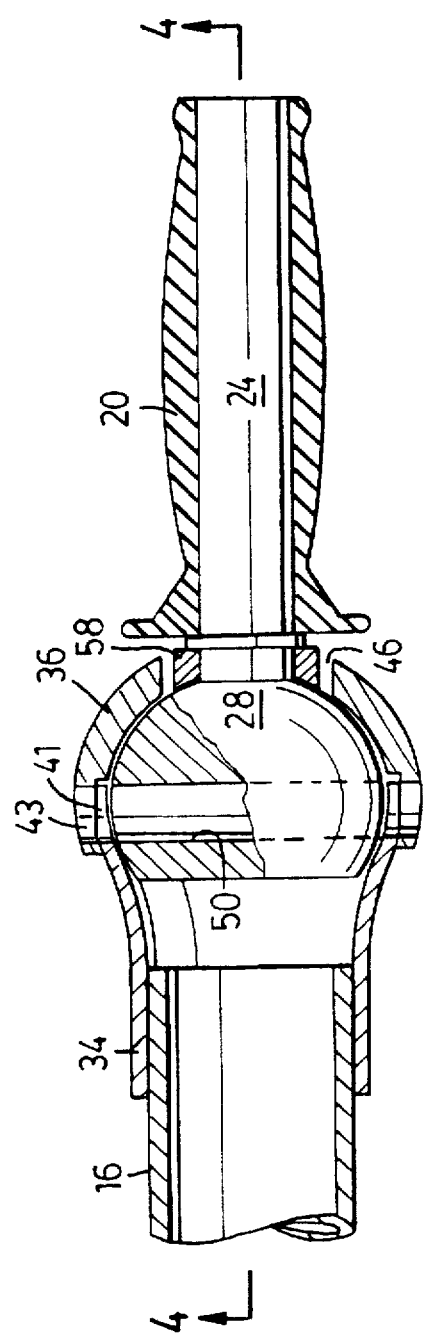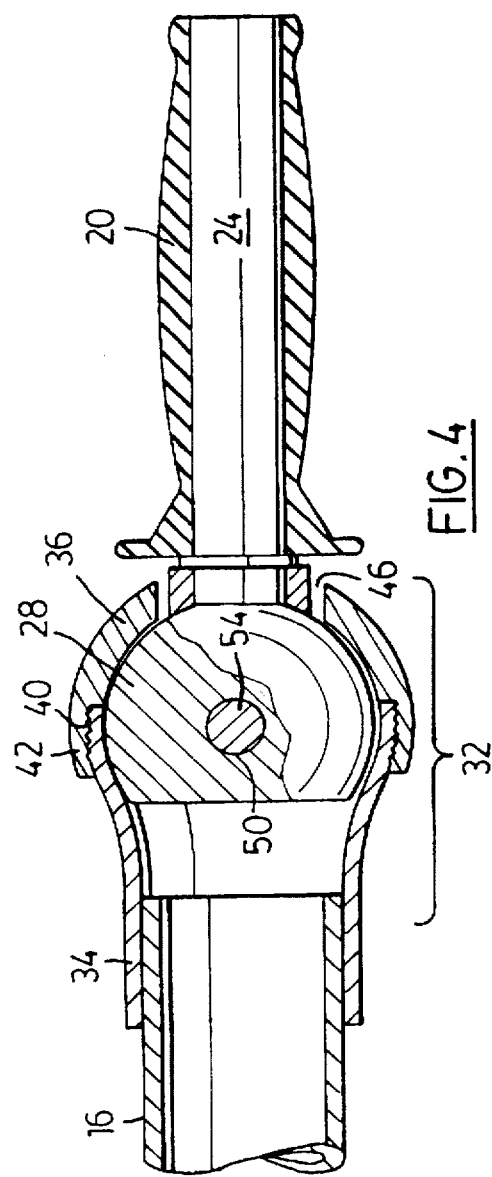

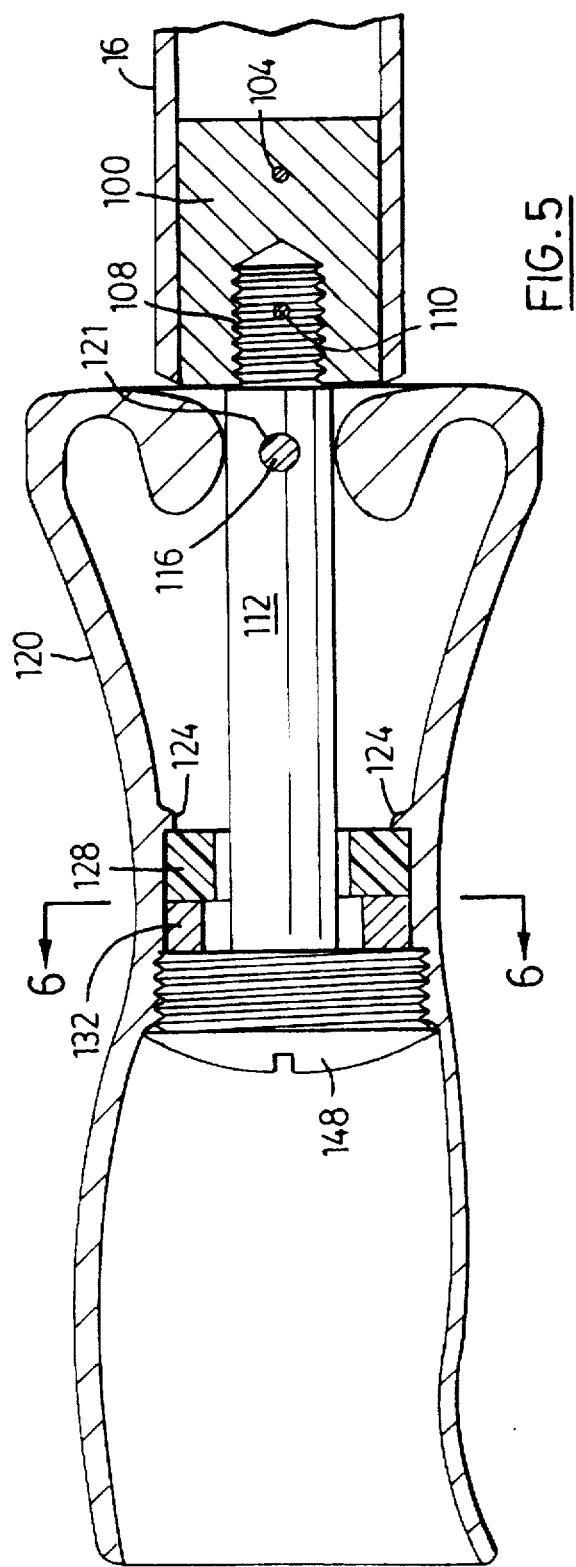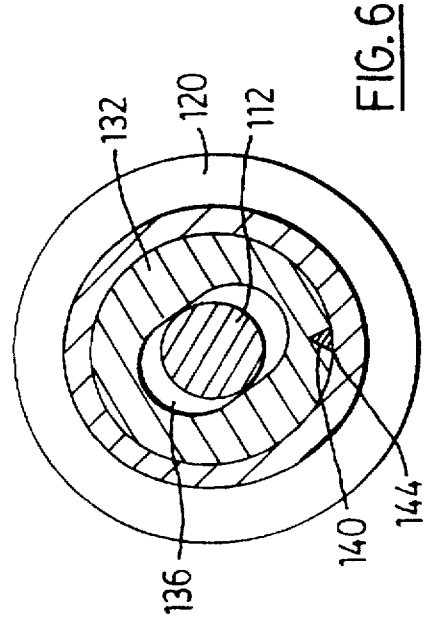

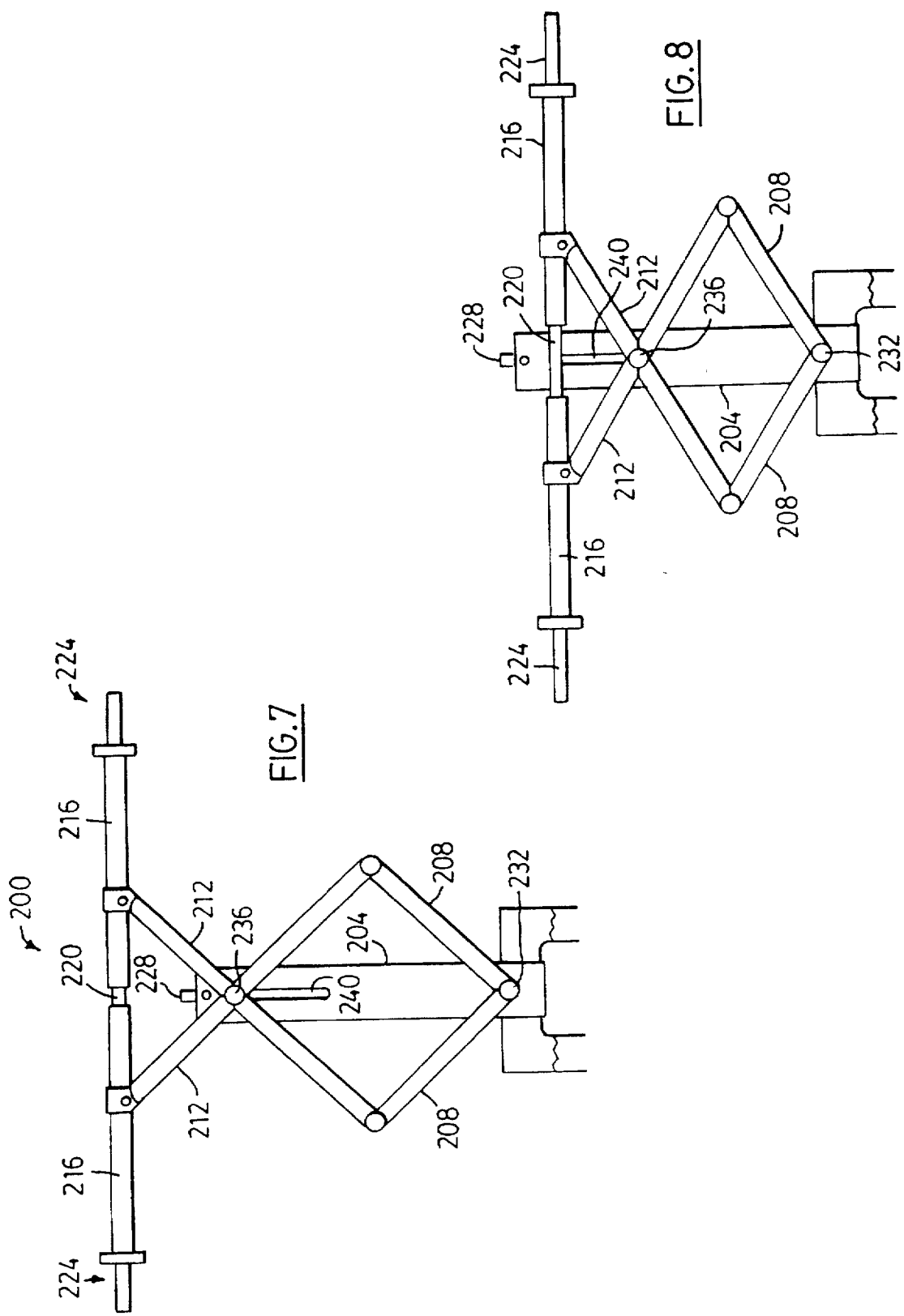

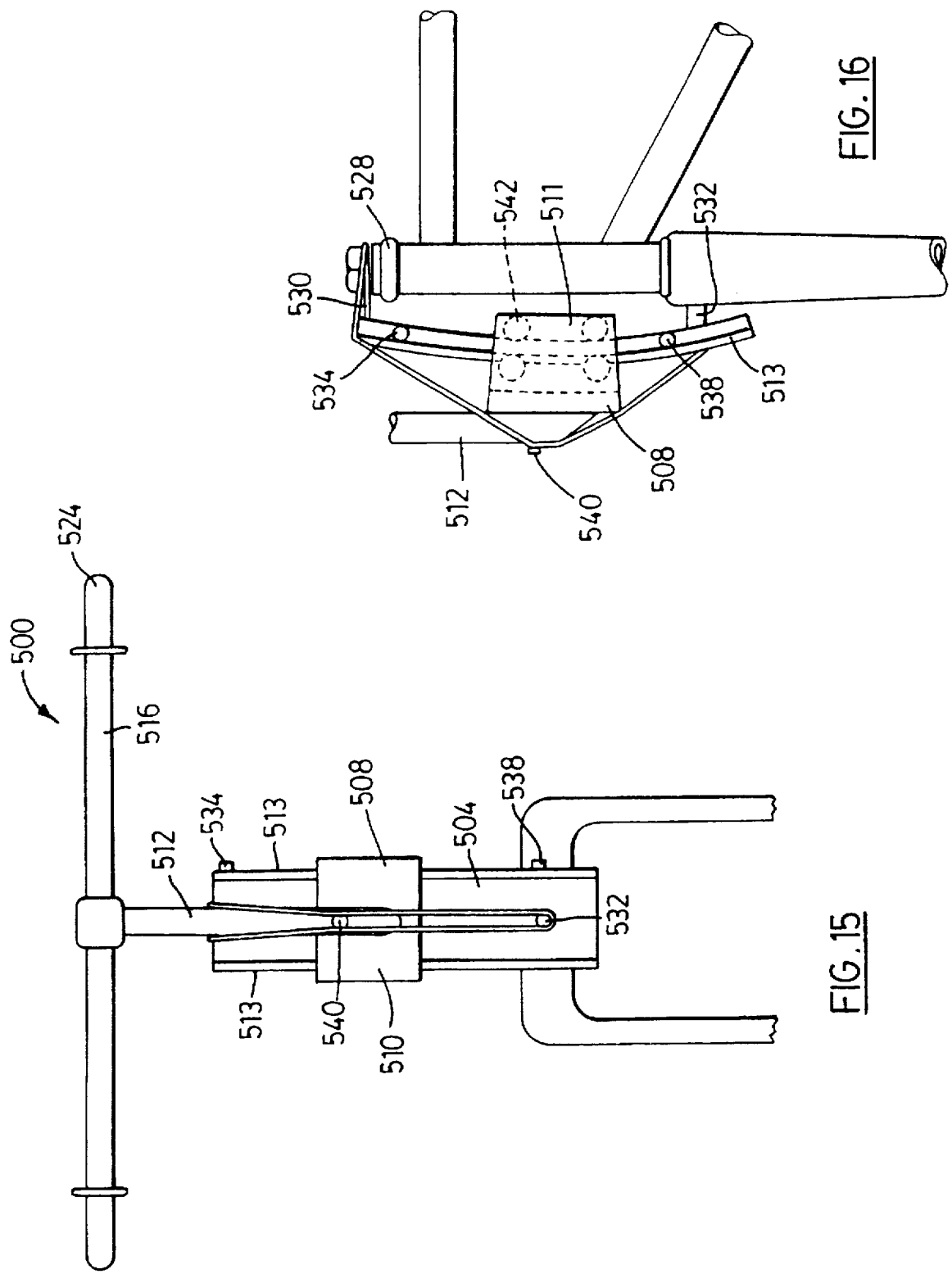

BICYCLE

This is a division of application Ser. No. 08/286.818, filed Aug. 5, 1994 U.S. Pat. No. 5,501,477.

BACKGROUND OF THE INVENTION

1. Field of the Invention

The present invention relates to an improved bicycle. More specifically, the present invention relates to a bicycle wherein a degree of movement of at least a portion of the handlebar is provided to allow improved riding posture and/or performance.

2. Description of the Prior Art

Many different types of bicycles are known, from classic penny farthing bicycles, to sophisticated multi-speed racing bicycles, and high performance off-road bicycles, commonly referred to as 'mountain bikes'.

All bicycles, regardless of their intended use, typically include a frame, a pair of wheels, a seat or saddle, a set of handle bars and a crank to which a pair of foot pedals are attached. Depending upon the intended use for the bicycle, several of these components may be specially adapted or additional components may be provided to give specific advantages to the rider. For example, on a multi-speed racing bicycle, the frame may be fabricated from titanium or carbon fibre composite materials to reduce weight. Similarly, high performance mountain bikes may include front and/or rear wheel suspension systems to accommodate rough, off-road, riding conditions.

Despite the developments to bicycles which have occurred over the years, the basic position and/or posture of the rider on the bicycle has been little changed. Typically, the rider stands on the foot pedals, or sits on the seat, and pulls against the handlebars as the pedals are worked. When the bicycle is being ridden hard, i.e. when sprinting or when trail riding, etc., a direct connection between the rider and the bicycle frame is effectively provided through the handlebars. The present inventor has found that this direct connection between the rider and the frame of the bicycle affects the handling and performance of the bicycle in an undesirable manner.

SUMMARY OF THE INVENTION

It is an object of the present invention to provide a novel bicycle which obviates or mitigates the above-mentioned disadvantages of the prior art.

According to a first aspect of the present invention, there is provided an improved bicycle including a handlebar assembly comprising: a handlebar; and means to provide limited movement of at least a handgrip portion of said handlebar, relative to the frame of the bicycle, in first and second directions, said first direction being along a path tangent to the rear wheel axle of the bicycle and said second direction being along a path tangent to the front wheel axle of the bicycle.

BRIEF DESCRIPTION OF THE DRAWINGS

Embodiments of the present invention will now be described, by way of example only, with reference to the accompanying drawings, in which:

FIG. 3 shows a section of a portion of the handlebar assembly of FIG. 2;

FIG. 4 shows a section taken along line 4—4 in FIG. 3;

FIG. 5 shows a section of a handlebar assembly of another embodiment of the present invention;

FIG. 6 shows a section taken along line 6—6 of FIG. 5;

FIG. 7 shows a handlebar assembly of another embodiment of the present invention in a first position; and FIG. 8 shows the handlebar assembly of FIG. 7 in a second position;

FIG. 15 shows a front view of another embodiment of the present invention; and

FIG. 16 shows a side view of the embodiment of FIG. 15.

DETAILED DESCRIPTION OF THE PREFERRED EMBODIMENTS

Figure 1:
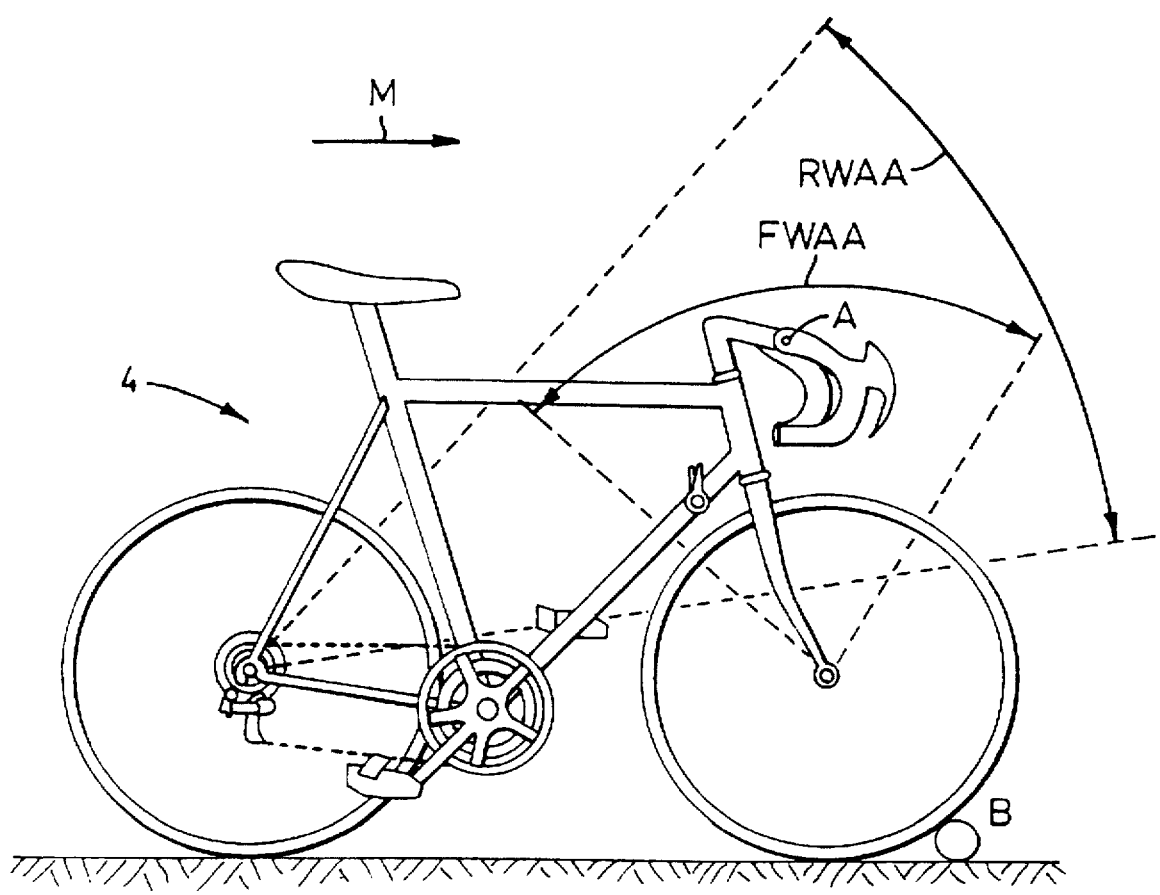
FIG. 1 shows a conventional bicycle and the geometry of its motion over an obstacle.

FIG. 1 illustrates a conventional bicycle 4 and the principles of its motion over irregularities and obstacles. The arrow labelled M represents the general direction of motion of bicycle 4. Essentially, the handlebars of bicycle 4 follow two movement paths as obstacles and irregularities are encountered. As the front wheel of bicycle 4 passes over an obstacle B, the handlebars will pivot upward and rearward along an arc centered at the rear wheel axle with respect to the ground. This arc is referred to herein as the rear wheel axle arc (RWAA).

If an irregularity, such as a hole, is encountered by the front wheel, the handlebars will pivot forward and downward along arc RWAA. Similarly, as the rear wheel of the bicycle encounters irregularities and obstacles, the handlebars pivot about the front wheel axle through an arc which is referred to herein as the front wheel axle arc (FWAA). As is clear from the Figure, the radius between the rear wheel axle and the handlebars is greater than the radius from the front wheel axle to the handlebars and thus the handlebars move along RWAA to a greater extent than they travel along FWAA.

The present inventor has determined that, by allowing the handlebars of the bicycle to essentially remain motionless with respect to the ground when an obstacle or irregularity is encountered, improved handling and performance of the bicycle is obtained. Specifically, by providing the handlebars with a range of movement along, or closely approximating movement along, the RWAA and FWAA, the disturbances to the interaction between the rider and the bicycle's frame are reduced.

Figure 2:
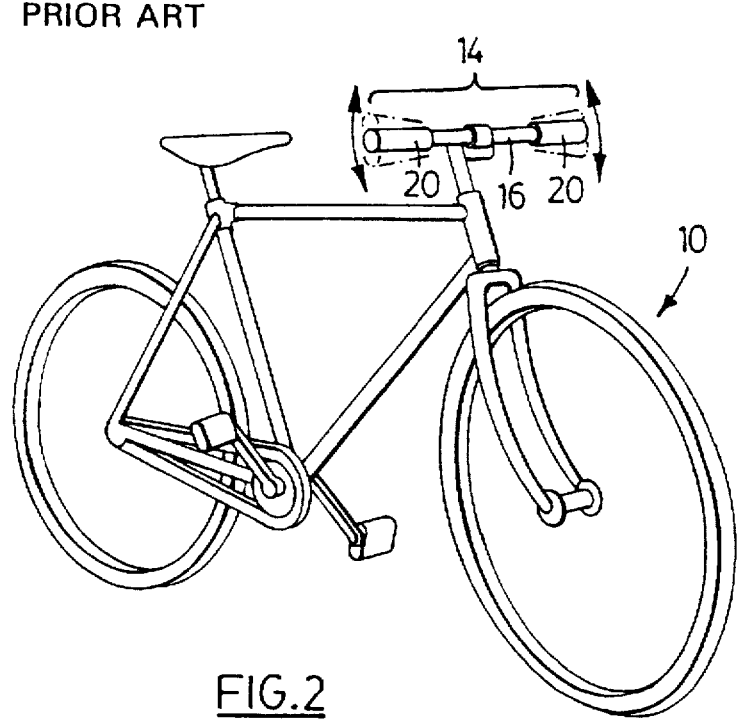
FIG. 2 shows a conventional bicycle which has been equipped with a handlebar assembly in accordance with an embodiment of the present invention.

FIG. 2 shows a conventional bicycle 10 which has been fitted with a handlebar assembly 14 in accordance with an embodiment of the present invention. As indicated in the Figure, handlebar assembly 14 includes a handle bar 16 and a pair of handgrips 20 which, as described below, are pivotable between backward-upward and forward-downward positions to provide a range of linear motion approximating motion along the RWAA. The degree of motion along the RWAA is referred to herein as RWAA clearance. Similarly, the degree of motion along the FWAA is referred to as FWAA clearance.

In the embodiment shown in FIGS. 3 and 4, the pivotal motion of the handgrips 20 is provided through a ball and socket configuration which is connected to handlebar 16. Specifically, handgrip 20 is mounted on a control shaft 24 which is in turn connected to ball 28. Ball 28 is located within a socket 32 formed from two socket halves 34,36. In the illustrated embodiment, socket half 34 is connected to handlebar 16 by a weld, although an integrally formed clamp or any other suitable means as would occur to those of skill in the art may be employed.

The outer periphery of socket half 34 distal handlebar 16 includes a threaded portion 40 and a semi-circular notch 41 formed across the diameter of that periphery. Socket half 36 is dome-shaped and includes an aperture 46 through which control shaft 24 is passed. Socket half 36 includes a threaded portion 42 on its interior periphery which is complementary to threaded portion 40 and a semi-circular notch 43 is formed across that periphery. As shown in the Figures, when properly assembled by engaging threaded portions 40 and 42, socket halves 34,36 form a socket within which ball 28 is received and the semi-circular notches 41,43 of each socket half 34,36 aline to form a pair of diametrically opposed openings through socket 32.

Ball 28 includes a through bore 50 which is aligned with the diametrically opposed openings through socket 32 to allow a pivot pin (not shown) to be inserted therethrough. This pivot pin, which may be any suitable bolt and nut combination (or equivalent) serves both as a pivot about which handgrip 20 may approximate motion along the RWAA and as a lock to prevent socket halves 34,36 from coming unscrewed over time.

To provide shock absorption at the limits of the RWAA clearance, an annular elastomeric bushing 58 is placed about control shaft 24 adjacent aperture 46 and at the limits of the RWAA clearance, bushing 58 contacts the edge of aperture 46 to resist further movement. Within the RWAA clearance, handgrip 20 is free to pivot upward-backward and downward-forward. While an RWAA clearance of as large a size as possible is preferred, the design of this embodiment effectively limits the RWAA clearance to approximately ½ inch at handgrips 20 which the present inventor has still found to provide an noticeable improvement in performance and handling.

FWAA clearance is provided by selecting the diameter of ball 28 to be approximately 100 thousands of an inch smaller than the interior diameter of socket 32. Bore 50 is then sized such that ball 28 may slide along the pivot pin and this allows a small amount of linear movement to approximate movement along the FWAA. As is discussed above, due to the smaller radial distance between the front wheel axle and the handlebars of the bicycle, movement along the FWAA is substantially less than movement along the RWAA and thus FWAA clearance is correspondingly smaller. The present inventor has determined that a maximum FWAA clearance of 10% of the RWAA clearance provides the necessary motion of the handlebars while ensuring that good steering control is maintained. Accordingly, the small range of movement of ball 28 along the pivot pin has been found to provide adequate FWAA for each handgrip 20.

As discussed above, the movement of the handgrips provided by this embodiment are linear and thus only approximate RWAA and FWAA clearances. However, the movement of ball 28 along the pivot pin also provides a small amount of forward-upward and backward-downward movement of handgrips 20 when movement along the RWAA occurs and this allows a closer approximation of an arcoidal movement of handgrips 20.

While this embodiment of the present invention will function without the ball and socket arrangement described of the preferred embodiment, as discussed below with reference to FIGS. 5 and 6, the present inventor was concerned that failure of a pivot pin in the configuration would result in the handgrip being disconnected from the handlebar with dangerous consequences. Accordingly, the present ball and socket embodiment was selected so that, even in the event of failure of the pivot pin, handgrip 20 will remain connected to handlebar 16. It will be apparent to one of skill in the art that, while the ball and socket arrangement is preferred for these reasons, other alternatives may be employed if failure of the pivot pin is deemed unlikely.

FIGS. 5 and 6 show another embodiment of the present invention. In this embodiment, each end of handlebar 16 is fitted with a plug 100 which is maintained in place by a set pin or rivet 104. Plug 100 includes a threaded bore 108 in which a complementarily threaded end of a control shaft 112 is inserted and a set pin or rivet 110 is provided to prevent rotation of control shaft 112. A pivot pin 116 is passed through hollow handgrip 120 and through a bore 121 in control shaft 112 adjacent the threaded end as shown. Bore 121 is slightly oversized to pin 116 to provide approximately a three thousands of an inch clearance therebetween.

Handgrip 120 includes an interior annular boss 124 against which an annular elastomeric bushing 128 is positioned, annular bushing 128 encircling the end of control shaft 112 which is distal the threaded portion. A control plate 132 is positioned immediately adjacent annular bushing 128 and also encircles control shaft 112. As best shown in FIG. 6, control plate 132 includes an elliptical cutout 136 within which the end of control shaft 112 may move primarily along the major axis of the ellipse and, to a very limited extent, along the minor axis of the ellipse. Control plate 132 is orientated such that the major axis of oval cutout 136 approximates a path along the RWAA and perpendicular to the longitudinal axis of pivot pin 116 and the minor axis approximates a path along the FWAA. Thus, handgrip 120 may pivot about pivot pin 116, along the major axis, and to a much lesser extent the minor axis, of oval cutout 136.

A keyway 140 in control plate 132 engages a complementary key 144 on handgrip 120 to maintain control plate 132 close to the RWAA. A dust cap 148 is threaded into handgrip 120 and maintains control plate 132 and bushing 128 in place. Cutout 136 in control plate 132 reduces the stress on pivot pin 116 by reducing the lateral forces which can be applied to it.

As with the previously described embodiment of FIGS. 3 and 4, handgrip 120 is thus capable of pivotal movement along paths approximating the RWAA and, to a more limited extent, the FWAA. The size of the RWAA clearance is limited by the size of the center of annular bushing 128 which in turn is limited by the elastomeric properties of the bushing to provide suitable shock absorbing capabilities at the limits of the RWAA clearance. At the extreme, the maximum size of the RWAA clearance is determined by the size of cutout 136 in the direction of its major axis.

The size of the FWAA clearance is limited by the clearance between bore 121 and pin 116 and the clearance between the end of control shaft 112 and the walls of oval cutout 136.

While the above-described embodiments have been found to provide advantages over prior art handlebars by providing RWAA and FWAA clearances within which the handgrips may be freely moved while being relatively inexpensive to manufacture, these embodiments provide a limited amount of RWAA and FWAA clearance. The present inventor has found that in many circumstances it would be preferred to have an RWAA clearance on the order of 8 inches and a correspondingly sized FWAA clearance. An embodiment of the present invention which provides such a range of clearances is illustrated in FIGS. 7 and 8.

FIG. 7 indicates generally a handlebar assembly 200 which includes a control plate 204, two lower linkage arms 208, two upper linkage arms 212, two handlebar sections 216, a handlebar section extender 220 and a pair of handgrips 224. Control plate 204 is in the form of an inverted L-shaped member with the top of the plate being the foot of the L and the bottom of the plate being the upright of the L. The top of control plate 204 is mounted to a conventional bicycle steering head 228 and the bottom of control plate 204 is mounted to a brake bolt hole 232 in the fork crown of a conventional bicycle. It is preferred that a spacer (not shown) be placed between mount point 232 and control plate 204 such that the plane of control plate 204 is substantially tangent to the RWAA.

In addition to the bottom of control plate 204, one end of each of lower linkage arms 208 is also connected to the fender mount point 232 such that linkage arms 208 may pivot about mount point 232. The other end of each of lower linkage arms 208 is pivotally connected to the lower end of different ones of upper linkage arms 212. A control pivot pin 236 connects upper linkage arms 212 at about their midpoint and the upper end of each of upper linkage arms 212 is pivotally connected to a different one of handlebar sections 216. As will be apparent, the resulting configuration is a parallelogram linkage which allows handlebar sections 216 to be moved between upward (shown in FIG. 7) and downward (shown in FIG. 8) positions.

To limit the range of movement of the parallelogram linkage, and thus handlebar sections 216, along RWAA control pivot pin 236 extends through a control slot 240 in control plate 204. While control pivot pin 236 is arranged to be movable along slot 240, it is also, to a limited extent of about an inch, able to move perpendicular to control plate 204 to provide a FWAA clearance. To provide shock absorbtion, a resilient biasing means such as elastic bands (not shown) are provided between control pin 236 and pivot pin 232, and between steering head 228 and control pin 236. The size of the elastic bands are selected to be larger than the distance between either endpoint and the neutral position which is the midpoint of travel of handlebars 216. As a result handlebars 216 may travel freely along the RWAA within a zone of selected size uninhibited by any elastic resistance from either end.

As will be apparent to those of skill in the art, due to the parallelogram linkage, handlebar sections 216 inevitably also move longitudinally as they are moved towards or away from the bicycle frame, sections 216 moving together as they move away and vice versa. To accommodate this movement, handlebar section extender 220 is provided. Section extender 220 comprises a tubular member whose outer diameter is sized to slidably engage the inner diameter of at least one of handlebar sections 216.

As will be apparent to one of skill in the art, while the embodiment of FIGS. 7 and 8 provide increased RWAA and FWAA clearances, the motion of the handlebars still only approximates the arcs of the FWAA and the RWAA. Embodiments of the present invention which provide for actual arcoidal motion of the handlebars are indicated in FIGS. 9 through 16.

Figure 9:
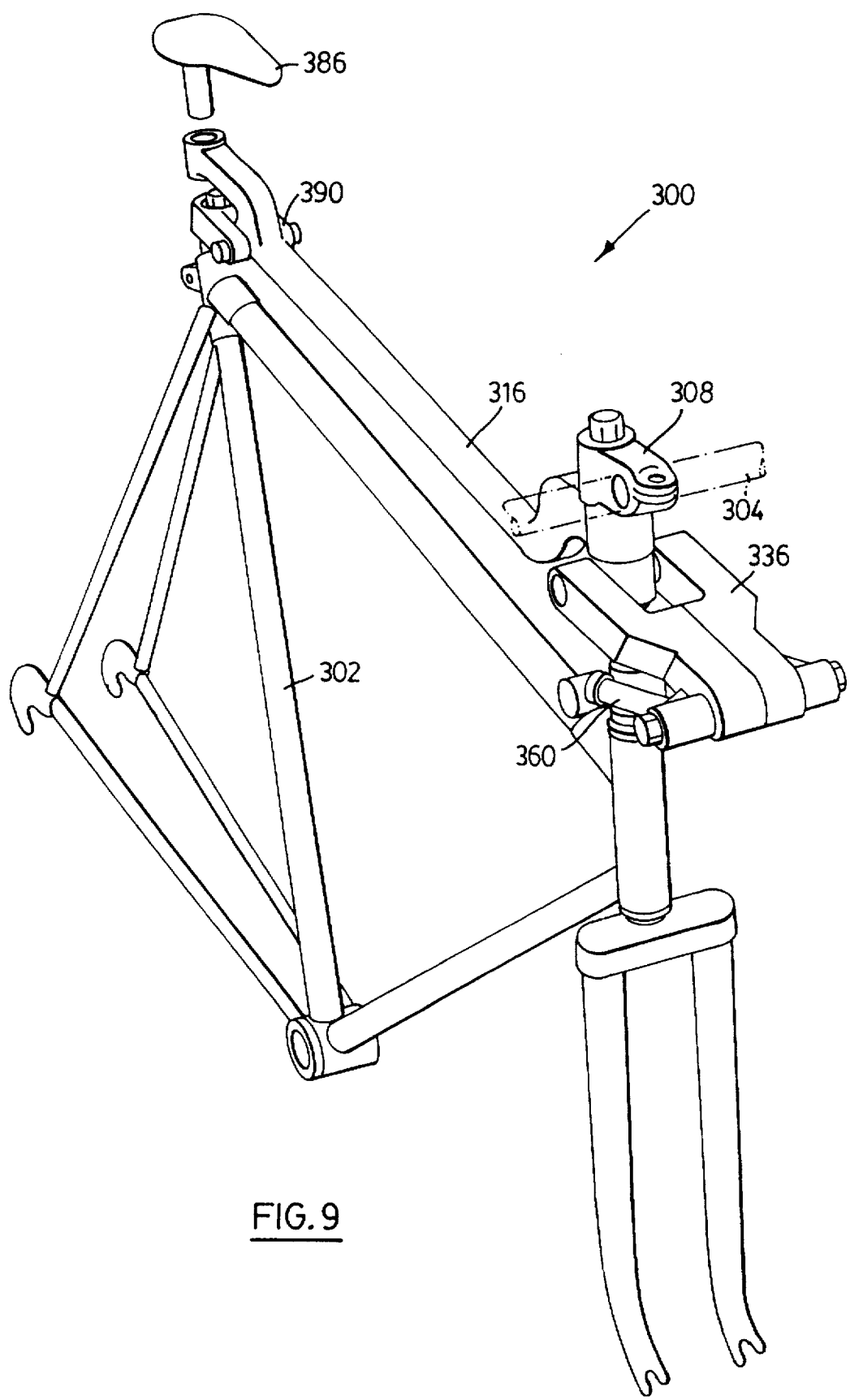
FIG. 9 shows a handlebar/seat assembly of another embodiment of the present invention.

FIG. 9 indicates generally a handlebar assembly 300 which includes a handlebar 304, a steering stem 308, a pivotable arm assembly 336, a control post 360, a seat linkage 316, a seat post assembly 390, and a conventional bicycle seat 386. As shown in the Figure, assembly 300 attaches to a bicycle frame 302 via control post 360 and seat post assembly 390 at the appropriate connection points.

Figure 10:
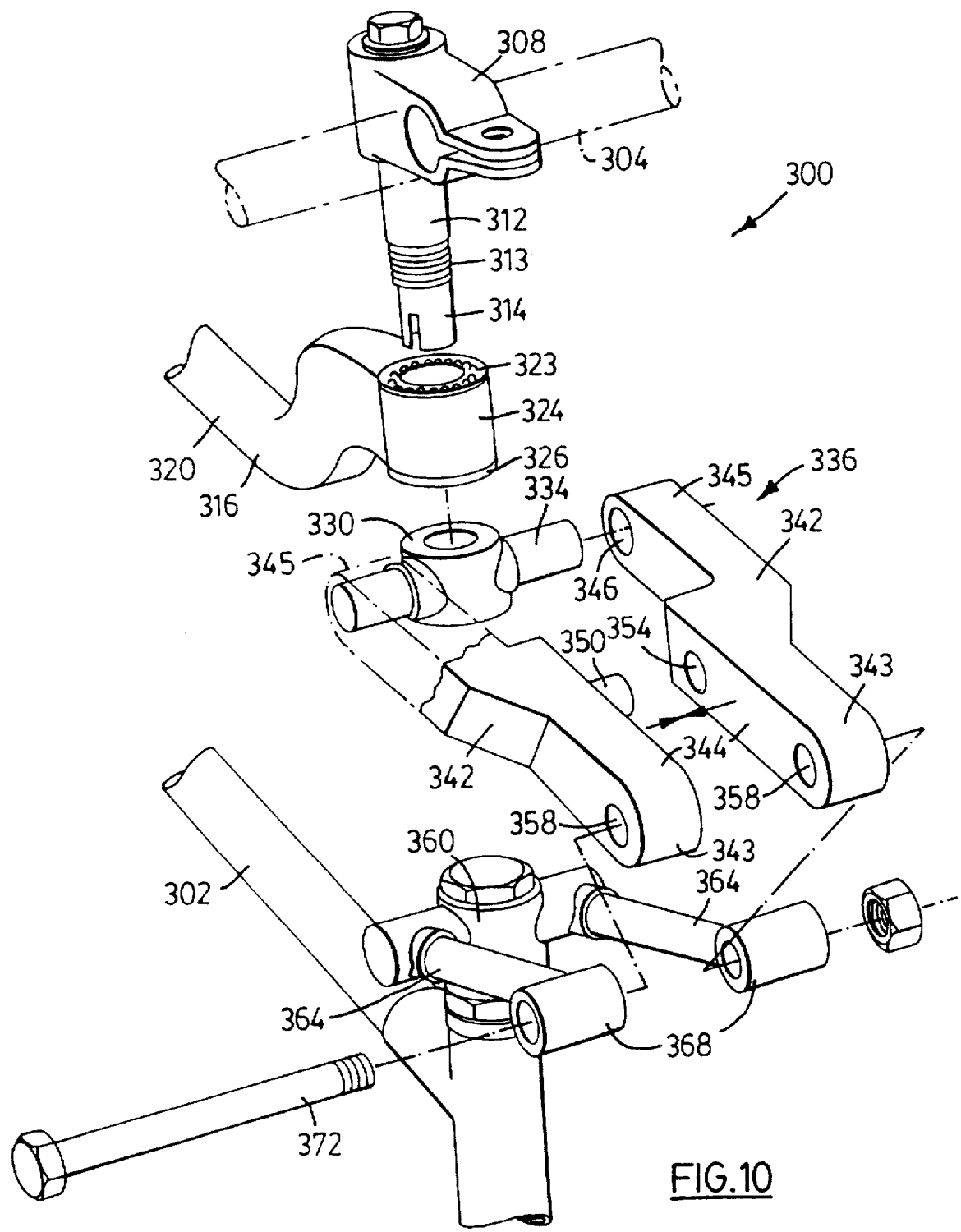
FIG. 10 shows an exploded view of the handlebar/steering portion of the assembly of FIG. 9.
Figure 11:
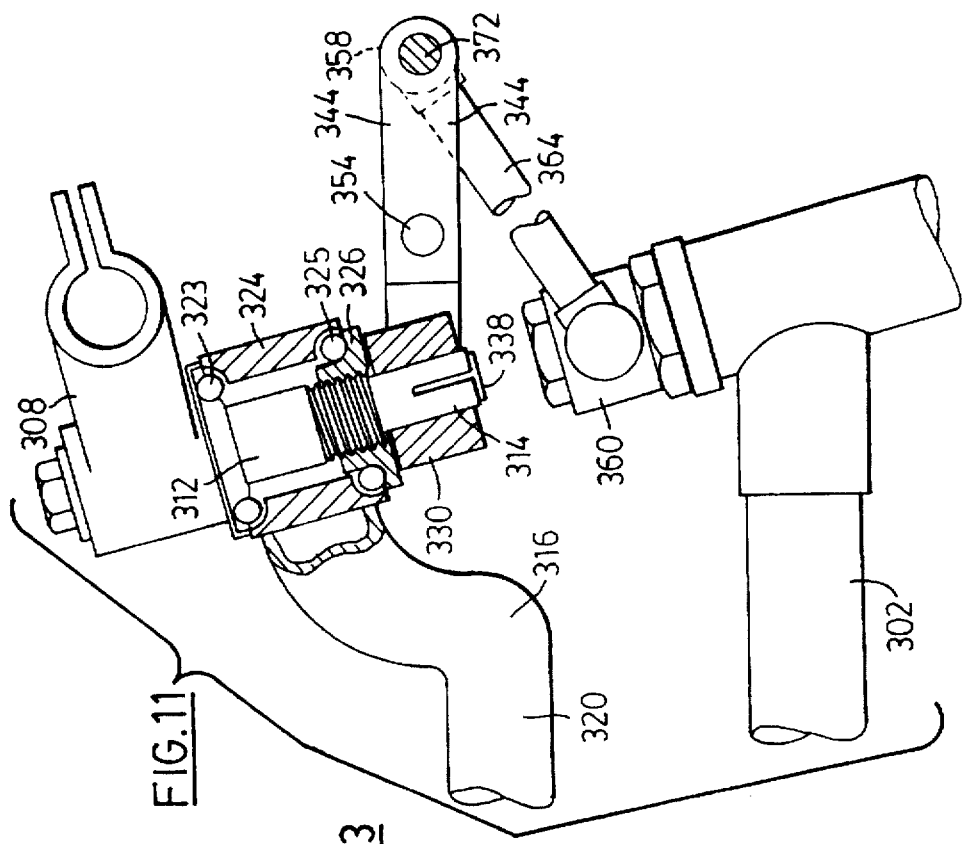
FIG. 11 shows a partial cutaway side view of the handlebar/steering portion of the assembly of FIG. 9.

As shown in FIGS. 10 and 11, handlebars 304 attach to steering stem 308 in a conventional manner. Steering stem 308 is further connected to one end of a tubular steering post 312. A threaded portion 313 positioned adjacent to and above a sleeve locking end 314 is provided on steering post 312 distal the steering stem end.

Post 312 passes through a collar 324 which is fixedly attached to a control arm 320 of seat linkage 316. Collar 324 is provided with upper and lower bearing rings 323,325 respectively. Upper bearing ring 323 contacts a bearing seat located on the underside of steering stem 308. Lower bearing ring 325 is seated in a complementary groove between the lower portion of collar 324 and a retaining ring 326. Retaining ring 326 is provided with a threaded inner portion which receives thread 313 of post 312 thereby securing upper and lower bearing rings 323, 325. The above described arrangement of components allows handlebars 304 to be turned freely within collar 324.

Pivotable arm assembly 336 comprises a steering collar 330 rigidly attached to a pair of diametrically opposed pivot pins 334, and a pair of mirror image pivoting arm members 342. The inner diameter of steering collar 330 is sized such that sleeve locking end 314 of steering post 312 can be inserted through steering collar 330 in a loose fitting manner. A friction pin 338 is inserted into sleeve locking end 314, spreading the outer diameter of locking end 314 thereby securing the members.

Each pivoting arm 342, comprises a bar having offset inner and outer portions, 343,345 respectively. As seen in FIG. 11, a substantially vertical mating face 344 extends along the length of inner portion 343. Each arm 342 is provided with three horizontal bores 346, 354, and 358. Bore 354, which penetrates only a portion of arm 342, is located on mating face 344 toward the midsection of arm 342 and receives a locking pin 350 when assembly 300 is assembled. Bores 358 and 346 are located at the ends of inner and outer portions 343,345 respectively.

As can be seen in FIG. 11, when pivotable arm assembly 336 is assembled, mating faces 344 of arm pair 342 are brought into contact such that locking pin 350 is received in bore 354. The pair of outer portions 345 form a generally U-shaped receptacle. Pivot pins 334 are inserted through bores 346 such that collar 330 is freely pivotable within the U-shaped receptacle.

Control post 360 attaches to a conventional bicycle steering column in the conventional manner. A pair of lower radius arms 364 are pivotally attached, in a diametrically opposed manner via a pair of pins (not shown), to the sides of control post 360, and project forwardly from the bicycle frame 302. The outward ends of lower radius arms 364 are provided with horizontally mounted collars 368 which have an inner diameter suitable for receiving a securing bolt 372. The collars 368 are spaced such that pivoting arm 342 may be inserted therebetween, apertures 358 brought into alignment and secured by bolt 372 inserted therethrough.

Figure 13:
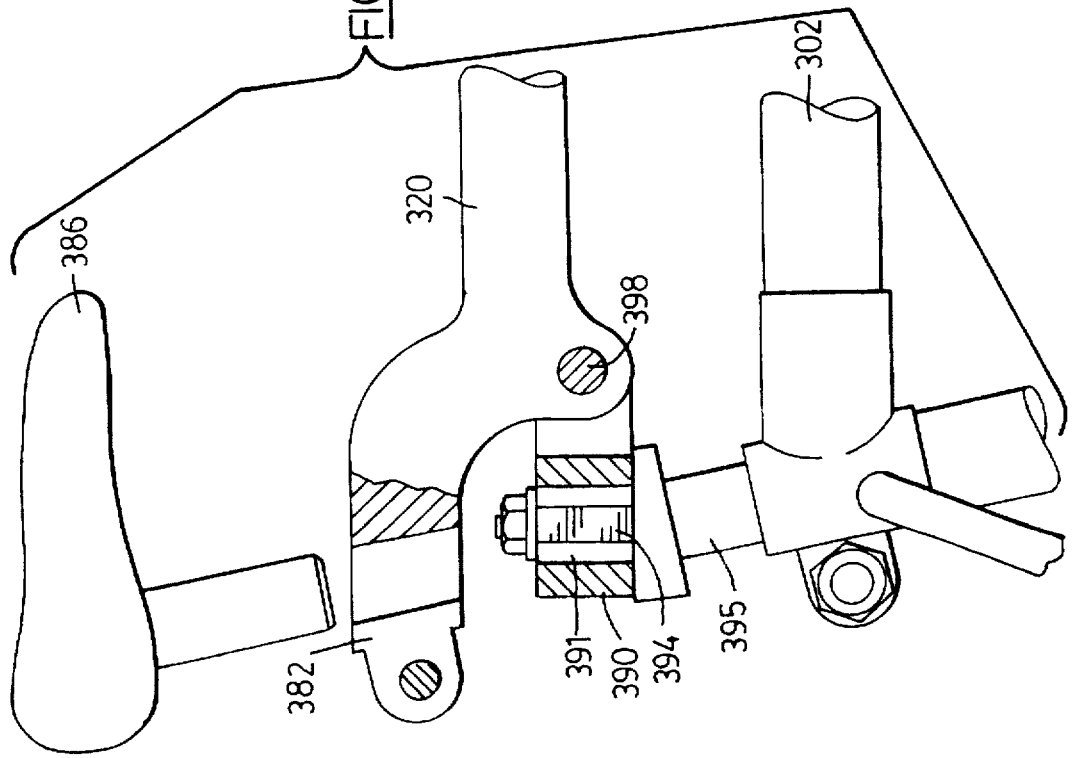
FIG. 13 shows a partial cutaway side view of the seat portion of the assembly of FIG. 9.
Figure 12:
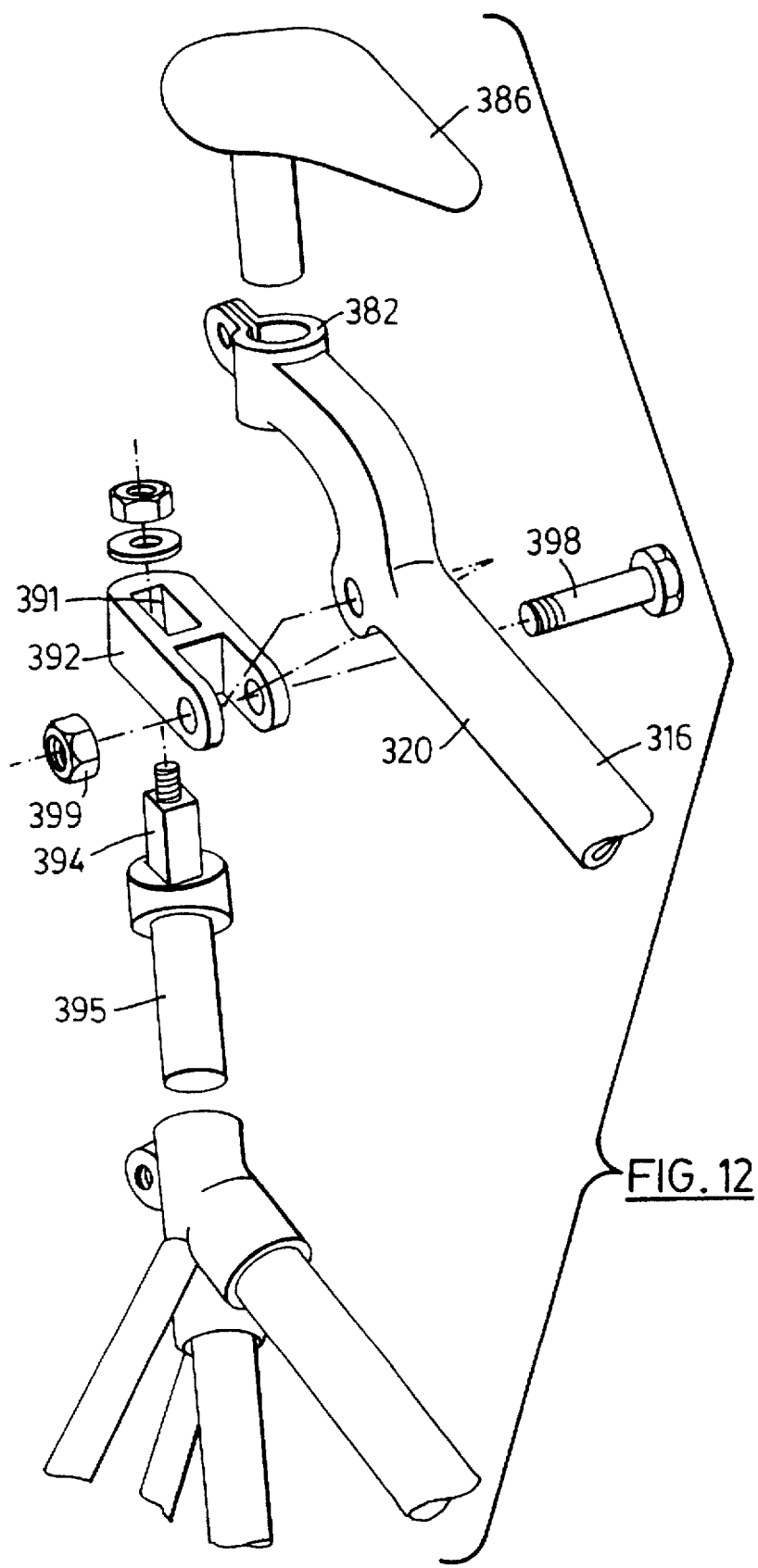
FIG. 12 shows an exploded view of the seat portion of the assembly of FIG. 9.

Seat post assembly 390 of assembly 300 is shown in FIGS. 12 and 13. Control arm 320 is rigidly attached to collar 324 and extends towards the rear of the bicycle where it is pivotally attached to a securing bracket 392 with a bolt 398 and nut 399. A seat post 395, the top of which is provided with a slider block 394, mounts into a conventional seat receptacle of bicycle frame 302. Slider block 394 is inserted into a slot 391 provided in bracket 392 and secured with a suitable fastener. Slot 391 and slider block 394 are sized to provide proper clearance for the FWAA of at least approximately 10 percent of the RWAA clearance.

Control arm 320 extends upwardly and rearwardly past the pivotal attachment point, terminating with a collar 382 in substantial alignment with, but above, seat post 395. A bicycle seat 386 is secured in collar 382 in a conventional manner.

As will be apparent, in operation rotation of stem 30 results in like rotation of collar 330, arms 342, lower radius arms 362 and post 360 resulting in rotation of the forks of the bicycle. Thus steering of the bicycle is accomplished conventionally.

As handlebar 304 is moved upwards or downwards, arms 342 pivot about pins 334 of collar 330 and about the pivotal connection between arms 342 and lower radius arms 364. Lower radius arms 364 pivot about the pins extending from post 360. This pivotal movement allows handlebars 304 to be moved between the backward-upward and forward-downward positions relative to the bicycle frame 302 while maintaining conventional steering control as mentioned above and maintaining handlebar 304 in a substantially horizontal position.

As handlebar 304 is moved upward, collar 324 also moves upward causing control arm 320 to rotate about pivot bolt 398 in the counterclockwise direction which causes seat 386 to rotate backwards. As handlebar 304 is moved downward, collar 324 also moves downward causing control arm 320 to rotate about bolt 398 in the clockwise direction which causes seat 386 to rotate forward.

This added rotation of the seat allows for improved isolation of the rider from shock to bicycle frame 302. When travelling over rough terrain, the rider leans forward on the bicycle, pushing handlebar 304 down and raising seat 386. This allows movement of the rider's arms forward and rotation of the rider's hips backwards, thereby shifting the rider's center of gravity forward, improving handling. Conversely, when sprinting, the rider pulls up on handlebar 304, moving seat 386 back and down, allowing the rider to rotate his hips forward to transmit greater torque to the bicycle crank.

While the arc travelled by handlebar 304 is not exactly coincident with the RWAA, as the center of the handlebar arc is different than that of the RWAA, the movement of slider block 394 serves to provide a degree of correction to the handlebar arc. Specifically, if the upper end of the handlebar arc is forward of the RWAA, slider block 394 tends to move back in slot 391 to compensate. Similarly, if the upper end of the handlebar arc is behind the RWAA, slider block 394 tends to move forward to slot 391. Thus slider block 394 and slot 391 provide both the FWAA clearance and a degree of correction for the difference between the handlebar arc and the RWAA.

Figure 14:
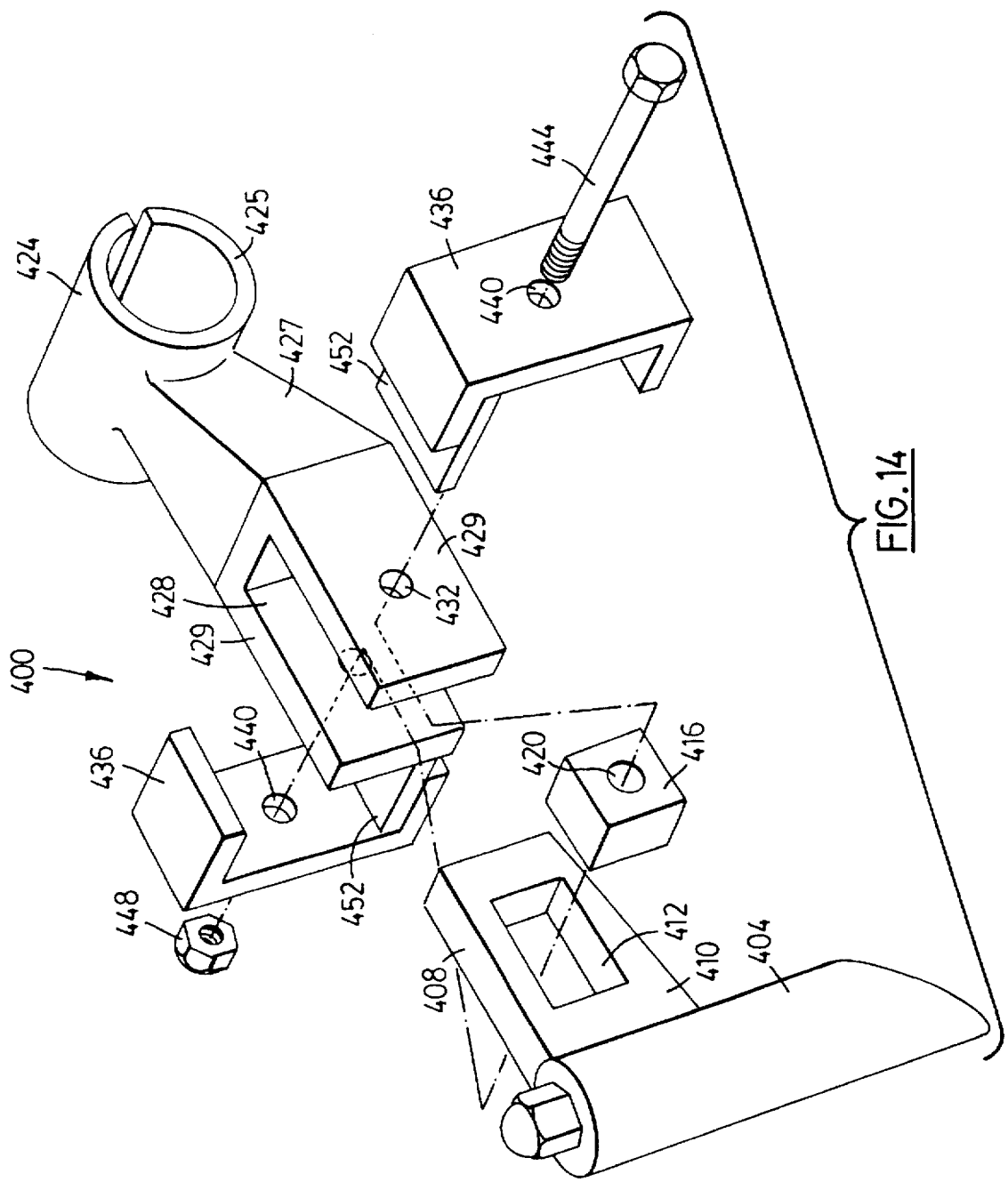
FIG. 14 shows a handlebar assembly of another embodiment of the present invention.

FIG. 14 indicates another embodiment of the present invention which provides arcoidal movement of the handlebars. In this embodiment, a handlebar assembly 400 includes an arm 408 rigidly attached to a post 404, a control arm 424, a pair of limiting brackets 436 and a pin member 444. Assembly 400 is designed to replace conventional steering post and stem assemblies.

The lower portion of post 404 is received by a conventional steering head of a bicycle. An arm 408, having a plate-like body and a pair of parallel faces 410, extends outwardly from the upper portion of post 404. A rectangular slot 412 is located through faces 410 and receives a slider block 416.

Slider block 416 is sized to allow it to move backward and forward in slot 412 to provide a sliding motion. This sliding motion, when combined with the pivoting action described below, closely approximate a path along the FWAA.

The desired range of motion of slider block 416 is contemplated to be from about ⅛ to ¼ of an inch. A bore 420 passes through slider block 416, perpendicular to faces 410.

Control arm 424 comprises a member 427 having one end provided with a pair of parallel fork arms 429 and an opposing end rigidly attached to barrel member 425. Barrel member 425 is formed as a conventional split ring clamp and is sized accordingly to receive most types of conventional handlebars, for example 20 racing, mountain, or Raleigh style, etc.

Member 427 extends from barrel member 425 and forked arms 429 form a U-shaped slot 428 which receives arm 408 as shown in FIG. 14. A pair of bores 432, having a longitudinal axis parallel to that of bore 420, passes through both fork arms 429. It is contemplated that control arm 424 be formed as a one piece casting but it may also be formed using other suitable methods as would be apparent to one of skill in the art. A pair C-shaped limiting brackets 436 are provided with a centrally located bore 440.

As indicated in the Figure, assembled arm 408, containing slider block 416, is positioned in slot 428 of forked arms 429, limiting brackets 436 are positioned around forked arms 429, slot 428 and arm 408 such that bores 420, 432 and 440 are in alignment. A pivot pin 444 is passed through the above mentioned bores thereby securing the assembly 400. While pivot pin 444 is shown as a bolt fastened with a locking nut 448 it will be apparent to one of skill in the art that any suitable fastening means may be employed. A pair of stop pads 452 are positioned within limiting bracket 436 at the upper and lover positions as indicated by the Figure. It is contemplated that stop pads 452 could be formed from any suitable elastomeric material having shock absorbing properties.

Assembly 400 is designed such that control arm 424 pivots about pin 444 while having the ability to slide in a horizontal backward-forward motion governed by slider-block 416 and slot 412. Assembly 400 is thus capable of pivotal movement to achieve arcoidal motion in the desired backward-upward, forward-downward directions along the RWAA. The range of RWAA clearance is defined by the size of the limiting brackets 436 and the thickness of stop pads 452. It is contemplated that an RWAA clearance of approximately 25° of pivotal movement on a 4 inch control arm 424 will be sufficient for many riding conditions and skill levels.

While the above-described embodiments have been found to provide arcoidal motion closely approximating the path along the RWAA, the embodiment of the present invention shown in FIGS. 15 and 16 allows for the handlebars to follow an arcoidal path very close to, or even exactly coincident with, the RWAA and FWAA of a bicycle.

In the most preferred embodiment of the present invention which is shown in FIG. 15, a handlebar assembly 500 is generally indicated including a control plate 504, a slider cart 508, a steering post 512, a handlebar 516 and a pair of handgrips 524. Control plate 504 is in the form of an arc having a radius coincident with the RWAA. A pair of keyed guided tracks 513 are provided along the vertical edges of the face of control plate 504. When viewed from the side as in FIG. 16, control plate 504 is positioned such that the top and bottom edges extend towards the rear of a bicycle. As shown in FIG. 16, the top of control plate 504 is mounted to a conventional bicycle steering head 528 via a bracket 530 and the bottom of control plate 504 is mounted to brake bolt 532 on a fork crown. A spacer (not shown) is placed between mount point 532 and control plate 504 as required such that control plate 504 is concentric about the rear axle of the bicycle.

Slider cart 508 comprises a face 510 and a pair of side panels 511. As seen when viewed from the side as in FIG. 16, slider cart 508 is curved concentric with control plate 504. Two pairs of rollers 542 are rotatably mounted to the interior faces of side panels 511 such that rollers 542 engage both guide tracks 513 and the back face of control plate 504.

A steering post 512 has one end rigidly attached and centred to face 510 of slider cart 508 in a substantially vertical manner and, tangent to the curve of slider cart 508 at the attachment point. The opposing end of steering post 512 is removably attached to handlebars 516 in a conventional manner.

As will be apparent, slider cart 508 provides arcoidal movement of handlebar 516 along the path defined by the control plate 504 which is substantially coincident with the RWAA. Rollers 542 are also arranged to provide a degree of free play normal to control plate 504. This free play provides the desired FWAA clearance for the handlebars 516. To limit the degree of arcoidal motion of handlebar 516, a pair of adjustable upper and lower stops 534, 538 are mounted on the side edges of control plate 504. Engagement of rollers 542 with stops 534, 538 prevents cart 508 from going beyond both the upper and lower ends or extremities of tracks 513. To provide shock absorbtion, a resilient biasing means such as elastic straps, or bands, are provided between brake bolt 532 and a pin 540, and between steering bracket 530 and pin 540. The size of the elastic straps are selected to be larger than the distance between either endpoint and the neutral position which is the midpoint of travel of handlebars 516. As a result handlebars 516 may travel along the RWAA within a zone of selected size uninhibited by any elastic resistance from either end.

As will be apparent to those of skill in the art, the above-described embodiments of the present invention may be retro-fitted to existing bicycles or supplied on new bicycles. In the former case, it is contemplated that kits will be provided to effect the conversion, the kits comprising the necessary components. Further, elastomeric bushings of varying properties may be provided, as part of the kit or separately, to provide riders with a free zone appropriately sized for their riding skill level and style.

What is claimed is:

1. An improved bicycle including a handlebar assembly comprising:

a handlebar;

a steering stem including a slot including an elongate axis;

a block member received in said slot and removable therein along said elongate axis;

a control arm pivotally connected to said block member and fixed to said handle bar, such that said handle bar is provided with an arcoidal movement about said block member and a forward back movement along said elongate axis;

and a limit member to limit the arcoidal movement of said handlebar about said block member.

2. An improved bicycle according to claim 1 further including shock absorbtion means in said limit member to provide shock absorbtion at said limits of said pivotal movement.

3. An improved bicycle according to claim 1 wherein said steering stem includes a post which is received by a conventional steering head of the bicycle.

4. An improved bicycle according to claim 1 wherein said handlebar mounting member further comprises a pair of parallel fork arms forming a U-shaped slot which movably receives the block member and steering stem.

5. An improved bicycle according to claim 4 wherein said parallel fork arms pivotally receives said block member by means of a pin member passing through a bore provided in the forked arms and the block member.

6. An improved bicycle according to claim 1 wherein the limit member comprises a pair of C-shaped members formed around the pivotal connection between the handle bar mounting member and the block member received in the slot of the steering stem.

7. An improved bicycle according to claim 4 wherein the handlebar mounting member further includes a split ring clamp for receiving the handlebar.

* * * * *